United States Patent [19]

Maeda et al.

[11] Patent Number: 4,756,599
[45] Date of Patent: Jul. 12, 1988

[54] OPTICAL FIBER USING VINYLIDENE FLUORIDE BASE TERNARY COPOLYMER AS CLADDING MATERIAL

[75] Inventors: Kazuhiko Maeda, Tokyo; Taku Yamauchi; Toshio Koishi, both of Kamifukuoka, all of Japan

[73] Assignee: Central Glass Company, Limited, Ube, Japan

[21] Appl. No.: 93,790

[22] Filed: Sep. 8, 1987

[30] Foreign Application Priority Data

Sep. 9, 1986 [JP] Japan .................................. 61-210608
Dec. 8, 1986 [JP] Japan .................................. 61-290392

[51] Int. Cl.$^4$ ........................... G02B 6/02; D02G 3/00
[52] U.S. Cl. ................................... 350/96.29; 428/373; 428/375; 428/378; 428/392; 428/394; 428/422; 428/442; 525/153; 525/199; 525/200; 528/220; 350/96.31; 350/96.34

[58] Field of Search ............... 428/373, 375, 378, 392, 428/394, 422, 442; 350/96.29, 96.31, 96.34; 525/199, 200, 153; 528/220

[56] References Cited

U.S. PATENT DOCUMENTS 4,617,350 10/1986 Maeda et al. ..................... 525/153
4,642,326 2/1987 Yasumura et al. ................. 525/153

FOREIGN PATENT DOCUMENTS 2161954 1/1986 United Kingdom .
2171219 8/1986 United Kingdom .

Primary Examiner—Sharon A. Gibson
Attorney, Agent, or Firm—Fleit, Jacobson, Cohn & Price

[57] ABSTRACT

The invention is an optical fiber having a core formed of either an inorganic glass or an organic polymer such as polymethyl methacrylate and a cladding layer formed of a ternary copolymer of vinylidene fluoride, hexafluoroacetone and either trifluoroethylene or tetrafluoroethylene. This cladding material is superior particularly in transparency and flexibility.

8 Claims, 3 Drawing Sheets

OPTICAL FIBER USING VINYLIDENE FLUORIDE BASE TERNARY COPOLYMER AS CLADDING MATERIAL

BACKGROUND OF THE INVENTION

This invention relates to an optical fiber having a core formed of either a glass or an organic polymer and a cladding layer formed of a vinylidene fluoride base ternary copolymer.

The recent developments of optical communication systems are quite remarkable, and practical applications of optical communication are extending over wide areas for various purposes including long distance and high capacity communication systems, local area networks, office automation and factory automation. Naturally, much efforts have been devoted to developments of various types of optical fibers.

Optical fibers using glasses in both the core and cladding are prevailing for long distance communication purposes. Organic plastics optical fibers, in which the core material is usually a methacrylic resin, have been developed mainly for short distance transmission purposes in view of their relative inferiority in respect of transmission loss and advantages in the ease of fabrication and processing and in the feasibility of considerabe enlargement of fiber diameters. Furthermore, recently increasing interest has been attached to composite type optical fibers having a glass core and an organic polymer cladding layer for use in short and medium distance transmissions.

For practicable optical fibers having an organic polymer cladding layer, the following items are required of the cladding material: (1) to be obtained at low cost, (2) to be sufficiently high in softening temperature, (3) to be excellent in processability as fiber, (4) to be good in adhesion to the core material, (5) to be sufficiently high in flexibility, (6) to be excellent in weatherability, (7) to be low in moisture absorption, (8) to be high in transparency and (9) to be low in refractivity. There are not many kinds of organic polymers that fully satisfy the above listed requirements.

Besides silicones, some fluororesins have been tested as cladding materials for optical fibers since fluororesins are inherently low in refractivity and excellent in weatherabiltiy. For example, JP-A No. 51-52849 shows using a copolymer of vinylidene fluoride (abbreviated to VDF) with tetrafluoroethylene (TFE) as the cladding material for an optical fiber having a glass core, and JP-A No. 53-60242 shows using a copolymer of VDF with trifluoroethylene (TrFE) as the cladding material for an optical fiber having a polymethyl methacrylate (PMMA) core. Such VDF base copolymers are obtained at relatively low costs. However, as the cladding material the VDF/TFE and VDF/TrFE copolymers are not fully satisfactory particularly in respect of transparency and flexibility.

GB-A No. 2,161,954 and GB-A No. 2,171,219 show optical fibers using a binary copolymer of VDF with hexafluoroacetone (HFA), which is better than VDF/TFE and VDF/TrFE copolymers in both transparency and flexibility. However, even these optical fibers are not deemed ideal in every respect.

SUMMARY OF THE INVENTION

It is an object of the present invention to provide an optical fiber having either a glass core or a plastic core and a fluororesin cladding layer which is superior in important characteristics to the previously proposed fluororesin cladding layers.

The present invention provides an optical fiber comprising a solid cylindrical core and a cladding layer which is formed of a ternary copolymer of vinylidene fluoride, hexafluoroacetone and a fluoroethylene having at least 3 fluorine atoms.

In other words, the cladding layer of an optical fiber according to the invention is formed of a ternary copolymer comprising VDF and HFA as the first and second components and either trifluoroethylene (TrFE) or tetrafluoroethylene (TFE) as the third component. In this optical fiber the core material is either an inorganic glass or an organic polymer such as, for example, PMMA.

Compared with binary copolymers of VDF with TrFE, TFE or HFA, ternary copolymers of VDF, HFA and either TrFE or TFE are lower in the degree of crystallinity and higher in flexibility and transparency. Furthermore, these ternary copolymers are sufficiently low in refractivity and very low in tackiness.

Optical fibers according to the invention can be made sufficiently small in transmission loss since VDF/HFA/TrFE and VDF/HFA/TFE copolymers have little absorption over a wide range of wavelengths including visible, ultraviolet and near-infrared regions. Of course these fluorine-containing ternary copolymers are excellent in chemical resistance and weather resistance and possess good thermal stability. For example, these copolymers exhibit no change in appearance for more than 2000 hr by a standard accelerated weathering test. Furthermore, there is good mutual solubility between these ternary copolymers and methacrylic resins preferred as the plastic core material. Accordingly, very strong adhesion is realized at the core-cladding interface in plastic optical fibers according to the invention.

As the cladding materials, VDF/HFA/TrFE copolymers and VDF/HFA/TFE copolymers do not significantly differ from each other in most important properties. However, VDF/HFA/TFE copolymers have an additional advantage that extrusion of the copolymers can be accomplished with remarkably reduced tendency toward coloration. In general VDF base copolymers exhibit some coloration when extruded or molded at 200°-270° C. by reason of formation of a very small quantity of hydrofluoric acid, but this tendency is suppressed by copolymerizing TFE.

Basically, this invention provides optical fibers of the step-index type. However, also it will be possible to produce graded-index type optical fibers according to the invention by appropriate designing with consideration of the aforementioned mutual solubility between the cladding copolymers and methacrylic resins as the core material.

DESCRIPTION OF THE PREFERRED EMBODIMENTS

Figure 1:
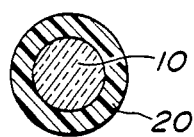
FIG. 1 is an explanatorily enlarged cross-sectional view of an optical fiber according to the invention.

As shown in FIG. 1, an optical fiber according to the invention has a thin cylindrical core 10 and a cladding layer 20 which has a substantially uniform thickness over the entire cylindrical surface of the core 10. It is optional to cover the outer surface of the cladding layer 20 with a protecting or reinforcing layer.

In this optical fiber the core 10 is formed of either an inorganic glass or an organic polymer. The inorganic glass may be either quartz glass or a multicomponent optical glass. As the organic polymer it is preferred to use polymethyl methacrylate (PMMA) or a copolymer of methyl methacrylate with another methacrylate or acrylate, though it is also possible to use polystyrene or a still different synthetic resin. The cladding layer 20 is always formed of a ternary copolymer of VDF, HFA and either TrFE or TFE.

When the core material is a glass, the optical fiber is manufactured by first forming the core by a conventional melt spinning method and successively passing the core in the form of a long filament through a coating tank containing a solution of the ternary copolymer, followed by drying. An analogous manufacturing method is practicable also when the core material is an organic polymer. However, in the case of a polymer core it is rather advantageous to manufacture the optical fiber by a simultaneous extrusion method using an extruder having two extrusion cylinders and an extrusion die-spinneret unit designed so as to form the core and cladding simultaneously.

As the cladding material, it is suitable to use a VDF/HFA/TrFE copolymer made up of 2–15 mol % of HFA, 0.5–40 mol % of TrFE and the balance of VDF or a VDF/HFA/TFE copolymer made up of 2–15 mol % of HFA, 5–60 mol % of TFE and the balance of VDF. In either case it is preferred that the copolymer contains at least 4 mol % of HFA. When the amount of TrFE or TFE in each ternary copolymer is in the above indicated range both flexibility and transparency of the copolymer become higher as the amount of HFA is increased, but the copolymer becomes too soft to use it as the cladding material when HFA amounts to more than 15 mol %. The transparency of each ternary copolymer is remarkably enhanced by increasing the amount of TrFE or TFE, and the mechanical strength of the copolymer as the cladding material is sufficient while the amount of TrFE is not more than 40 mol % or the amount of TFE is not more than 60 mol %.

A ternary copolymer for use as the cladding material is prepared by a radical copolymerization reaction, which is carried out in an organic liquid medium using an oil-soluble radical polymerization initiator. The reaction temperature is in the range from 0 to 130° C. As the organic liquid medium, either a saturated hydrocarbon such as, for example, n-hexane or n-heptane or a fluorine-containing solvent such as trichlorotrifluoroethane or dichlorotetrafluoroethane is suitable, though a selection can be made also from esters and ketones.

Both VDF/HFA/TrFE copolymers and VDF/HFA/TFE copolymers are soluble in ketones such as acetone, methylethyl ketone and methylisobutyl ketone, esters represented by ethyl acetate and n-butyl acetate and cyclic ethers represented by tetrahydrofuran and dioxane. When either a VDF/HFA/TrFE copolymer or a VDF/HFA/TFE copolymer is dissolved in any of such organic solvents to form the cladding layer of the optical fiber by a solution coating method, a suitable range of the concentration of the dissolved copolymer is from 2 to 30% by weight Also with respect to the VDF/HFA/TrFE or VDF/HFA/TFE copolymer as the cladding material, it is preferable that the intrinsic viscosity of the copolymer dissolved in N,N-dimethylacetamide at 30° C. falls in the range from 0.4 to 2.0 dl/g. When the intrinsic viscosity is lower than 0.4 dl/g it will be difficult to form a sufficiently strong cladding layer. When the intrinsic viscosity is higher than 2.0 dl/g the cladding operation may not smoothly be accomplished because of excessively high viscosity of the copolymer solution or excessively high melt index of the copolymer.

The invention is further illustrated by the following nonlimitative examples. Preparation and Testing of Copolymers Used in Examples

(1) VDF/HFA/TrFE Copolymers

First, 17 liters of 1,1,2-trichloro-1,2,2-trifluoroethane and 215 g of 4.5 wt % solution of heptafluorobutyryl peroxide in 1,1,2-trichloro-1,2,2-trifluoroethane were charged in a 34-liter stainless steel autoclave, which was provided with a stirrer and was dried in advance. After completely replacing the gas atmosphere in the autoclave by nitrogen gas the pressure in the autoclave was maintained at 200 mmHg. Then 1650 g of VDF monomer, 1740 g of HFA monomer and 54g of TrFE monomer were successively introduced into the autoclave. Operating the stirrer, the monomers in the autoclave were subjected to radical copolymerization reaction at 30° C. for 20 hrs. After that unreacted portions of the monomers were removed, and the slurry containing a precipitated copolymer was filtered, and the separated copolymer was washed and dried. In the obtained ternary copolymer the VDF/HFA/TrFE proportions were 88/10/2 by mol. This copolymer is referred to as copolymer 3F-A.

Another two runs of the above copolymerization reaction were carried out by using different quantities of monomers. In the second run 1770 g of VDF, 1320 g of HFA and 341 g of TrFE were copolymerized. In the obtained ternary copolymer, which will be referred to as copolymer 3F-B, the VDF/HFA/TrFE proportions were 84/7/9 by mol. In the third run 1230 g of VDF, 1275 g of HFA and 945 g of TrFE were copolymerized. In the obtained ternary copolymer, which will be referred to as copolymer 3F-C, the VDF/HFA/TrFE proportions were 65/7/28 by mol.

Figure 3:
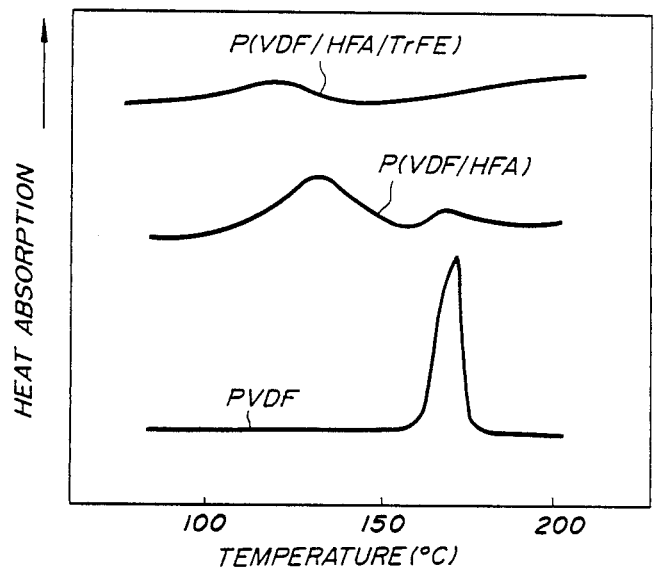
FIG. 3 is a chart showing calorimetric characteristics of three kinds of vinylidene fluoride base polymers including the aforementioned VDF/HFA/TrFE copolymer.

By testing with a differential scanning calorimeter (DSC), the copolymers 3F-A, 3F-B and 3F-C respectively exhibited very gentle endothermic peaks from which the melting temperatures of 3F-A, 3F-B and 3F-C were deduced to be 118° C., 115° C. and 114° C., respectively. With respect to the copolymer 3F-B, the DSC test result is shown in FIG. 3. For comparison, a VDF/HFA (90/10 by mol) copolymer and polyvinylidene fluoride (PVDF) were subjected to the same test. As can be seen in FIG. 3 the ternary copolymer, P(VDF/HFA/TrFE), is remarkably lower in crystallinity than PVDF and also than the VDF/HFA copolymer.

By measurement with Abbe's refractometer of Type 2, the refractive indexes of the copolymers 3F-A, 3F-B and 3F-C at normal temperature were 1.393, 1.391 and 1.389, respectively.

Acid resistance and alkali resistance of the copolymers 3F-A, 3F-B and 3F-C were tested by immersing samples of the respective copolymers in 10% solution of sulfuric acid for 10 days and separate samples in 10% solution of sodium hydroxide for 10 days. In both cases no change was observed in any sample.

Figure 2:
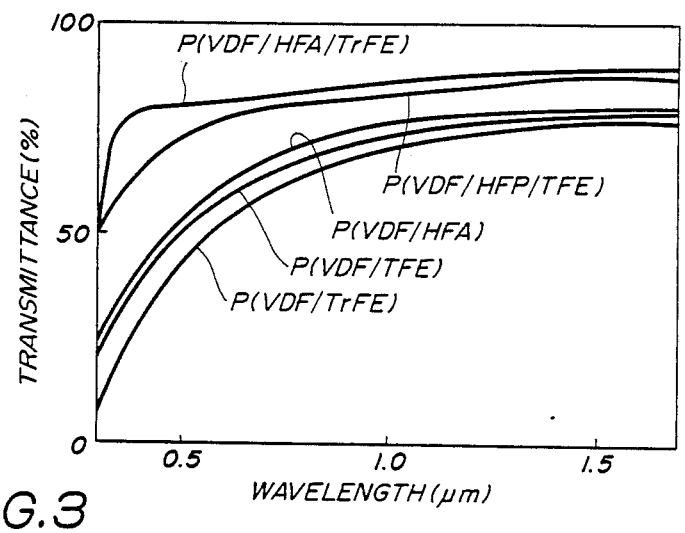
FIG. 2 is a graph showing the spectral absorption characteristics of five kinds of vinylidene fluoride base copolymers including a VDF/HFA/TrFE copolymer used in this invention.

The copolymer 3F-B was press-shaped under heating into a sheet having a thickness of 1 mm, and the copolymer sheet was subjected to measurement of spectral absorption. For comparison, a VDF/HFA (90/10 by mol) copolymer, a VDF/TrFE (70/30 by mol) copolymer, a VDF/TFE (80/20 by mol) copolymer and a ternary copolymer of VDF, hexafluoropropylene (HFP) and TFE (VDF/HFP/TFE =80/9/11 by mol) were each press-shaped into a 1 mm thick sheet and subjected to measurement of spectral absorption. The results are shown in FIG. 2. As is apparent the VDF/HFA/TrFE copolymer was very higher in light transmittance than the VDF base binary copolymers. The VDF/HFP/TFE copolymer was fairly high in transparency, but this copolymer was very soft and akin to rubber and exhibited tackiness.

The five kinds of copolymers indicated in FIG. 2 were each blended with PMMA by kneading with rolls at 140°–200° C. In every case the blending ratio was 1:1 by weight. The obtained polymer blends were each press-shaped at 190° C. into a 1 mm thick sheet, and light transmittance of each sheet for monochromatic light of 650 nm was measured. The results are shown in Table 1.

The aforementioned five kinds of copolymers were each dissolved in methylethyl ketone to obtain about 10 wt % solution. Each of the obtained solutions was spread on a quartz glass plate, followed by evaporation of the solvent, to thereby form a coating film having a thickness of 20 μm. Every coating film was dried for 3 days at 60° C. under reduced pressure, and then the strength of adhesion of each coating film to the glass surface was evaluated by the crosscut peeling test generally in accordance with JIS K 5400. The results are shown in Table 1, wherein 10 marks are full marks.

TABLE 1

| Copolymer | Light Transmittance of Blend with PMMA (%) | Adhesion to Glass (evaluation marks) |
|---|---|---|
| VDF/HFA/TrFE | 94 | 10 |
| VDF/HFA | 87 | 10 |
| VDF/TrFE | 80 | 8 |
| VDF/TFE | 82 | 6 |
| VDF/HFP/TFE | 90 | 10 |

Figure 4:
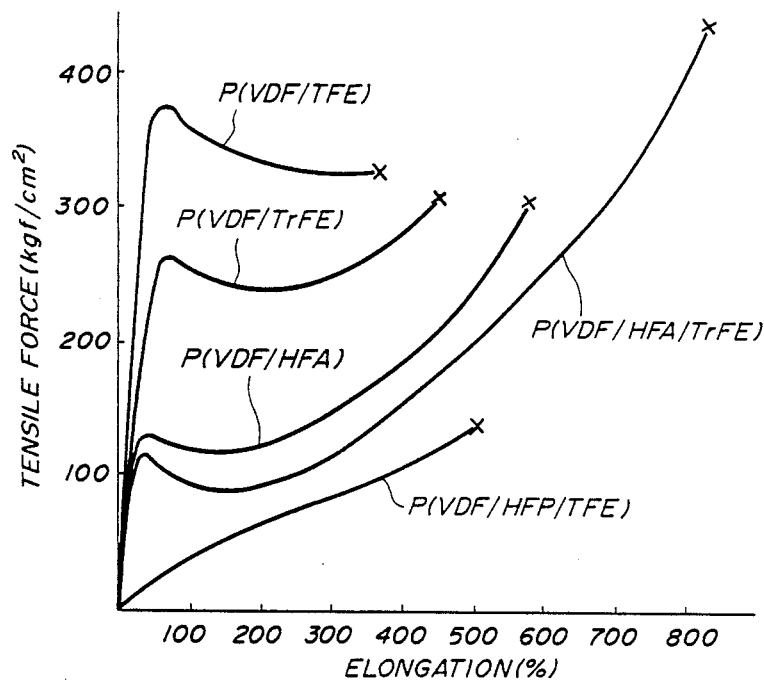
FIG. 4 is a graph showing the tensile characteristics of the aforementioned five kinds of vinylidene fluoride base copolymers.

The tensile characteristics of the five kinds of copolymers indicated in Table 1 were examined by the test method according to ASTM D 638. The results are shown in FIG. 4, wherein the "x" mark indicates break of each specimen. It is seen that the VDF/TFE copolymer and the VDF/TrFE copolymer exhibited behaviors of plastics whereas the VDF/HFP/TFE copolymer exhibited a rubber-like behavior. Both the VDF/HFA copolymer and the VDF/HFA/TrFE copolymer proved to be intermediate between plastics and rubber, but the VDF/HFA/TrFE copolymer was better in both elongation and break strength. The test results indicate that optical fibers using the VDF/HFA/TrFE copolymer as the cladding material will be excellent in both tensile strength and flexural strength.

(2) VDF/HFA/TFE Copolymers

Radical copolymerization of VDF, HFA and TFE was carried out by the method described hereinbefore with respect to the preparation of the VDF/HFA/TrFE copolymers. There was no change in the reaction conditions.

In the first run 1650 g of VDF, 1740 g of HFE and 110 g of TFE were copolymerized. In the obtained ternary copolymer, which will be referred to as copolymer 4F-A, the VDF/HFA/TFE proportions were 85/9/6 by mol. In the second run 1476 g of VDF, 767 g of HFA and 308 g of TFE were used. In the obtained ternary copolymer, which will be referred to as copolymer 4F-B, the VDF/HFA/TFE proportions were 80/7/13 by mol. In the third run 812 g of VDf, 468 g of HFA and 1270 g of TFE were used. In the obtained ternary copolymer the VDF/HFA/TFE proportions were 47/4/49 by mol.

Figure 6:
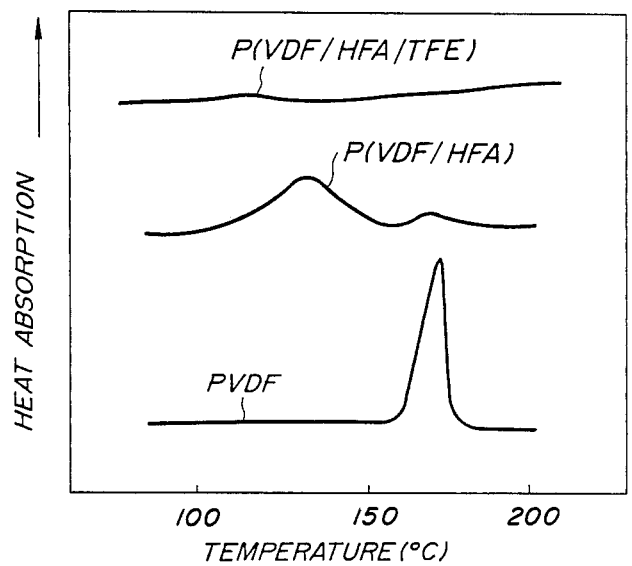
FIG. 6 is a chart showing calorimetric characteristics of three kinds of fluoro-polymers including the aforementioned VDF/HFA/TFE copolymer.

By testing with DSC, the copolymers 4F-A, 4F-B and 4F-C respectively exhibited very gentle endothermic peaks from which the melting temperatures of 4F-A, 4F-B and 4F-C were deduced to be 118° C. 110° C. and 111° C, respectively. With respect to the copolymer 4F-B, the DSC test result is shown in FIG. 6. For comparison, a VDF/HFA (90/10 by mol) copolymer and PVDF were subjected to the same test. As can be seen in FIG. 6 the ternary copolymer, P(VDF/HFA/TFE), is remarkably lower in crystallinity than PVDF and also than the VDF/HFA copolymer.

By measurement with Abbe's refractometer of Type 2, the refractive indexes of the copolymers 4F-A, 4F-B and 4F-C at normal temperature were 1.388, 1.386 and 1.381, respectively.

Acid resistance and alkali resistance of the copolymers 4F-A, 4F-B and 4F-C were tested by immersing samples of the respective copolymers in 10% solution of sulfuric acid for 10 days and separate samples in 10% solution of sodium hydroxide for 10 days. In both cases no change was observed in any sample.

Figure 5:
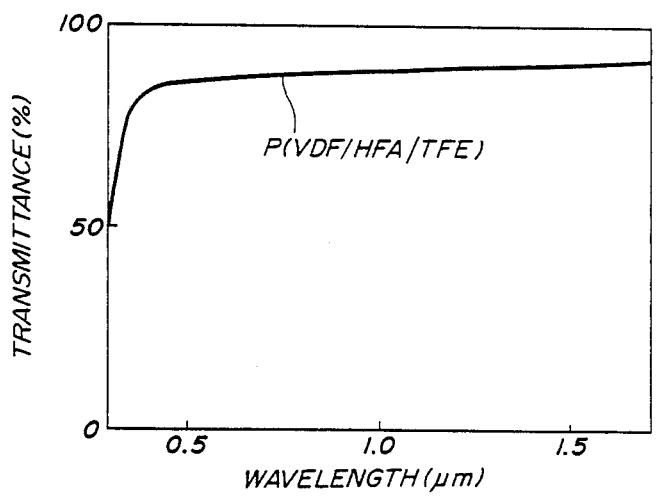
FIG. 5 is a graph showing the spectral absorption characteristic of a VDF/HFA/TFE copolymer used in this invention.

The copolymer 4F-B was press-shaped under heating into a sheet having a thickness of 1 mm, and the copolymer sheet was subjected to measurement of spectral absorption. The result was as shown in FIG. 5.

EXAMPLE 1

A quartz glass filament having a diameter of 125 μm was produced by using a melt spinning apparatus including a high-frequency induction furnace. The glass filament was guided into a coating solution tank which was placed right below the spinning apparatus at a vertical distance of 3 m. The coating solution was prepared by alternately dissolving one of the VDF/HFA/TrFE copolymers 3F-A, 3F-B and 3F-C in n-butyl acetate. In every case the concentration of the dissolved copolymer was 15 wt %. The wet filament was passed through a drier maintained at 60°–70° C. The optical fiber produced by this process was passed through a heat treatment oven maintained at 100° C. before winding it around a bobbin. In the obtained optical fibers the cladding layer formed of the copolymer had an average thickness of about 8 μm.

Additional three kinds of optical fibers were produced by the same method using the same materials except that the diamter of the glass filament was changed to 375 μm. In every optical fiber produced in this example the copolymer cladding layer was in very tight contact with the quartz glass core without any indication of peel or any other defect. These optical fibers were subjected to a light transmission test using a LED of 780 nm wavelength. The transmission losses of the respective optical fibers were as shown in Table 2.

EXAMPLE 2

The VDF/HFA/TFE ternary copolymers 4F-A, 4F-B and 4F-C were alternately used as the cladding material. Otherwise the optical fiber manufacturing process of Example 1 was repeated to obtain six kinds of optical fibers having a quartz glass core 125 μm or 375 μm in diameter.

In every optical fiber produced in this example the copolymer cladding layer was in very tight contact with the quartz glass core without any indication of peel or any other defect. These optical fibers were subjected to the aforementioned light transmission test. The results are shown in Table 2.

TABLE 2

| Cladding | Transmission Loss (dB/km) | |
|---|---|---|
|  | 125 μm core | 375 μm core |
| Copolymer 3F-A | 20 | 14 |
| Copolymer 3F-B | 18 | 12 |
| Copolymer 3F-C | 18 | 11 |
| Copolymer 4F-A | 20 | 14 |
| Copolymer 4F-B | 16 | 11 |
| Copolymer 4F-C | 16 | 10 |

EXAMPLE 3

Plastic optical fibers were produced by a simultaneous extrusion method. A commercial PMMA resin was used as the core material, and the VDF/HFA/TrFE copolymers 3F-A, 3F-B, 3F-C and the VDF/HFA/TFE copolymers 4F-A, 4F-B, 4F-C were alternately used as the cladding material. In every case the extrusion temperature was 230° C., and the optical fiber was 1 mm in diameter and about 15 μm in the thickness of the cladding layer. The obtained optical fibers were subjected to the aforementioned light transmission test. The results are shown in Table 3.

Figure 7:
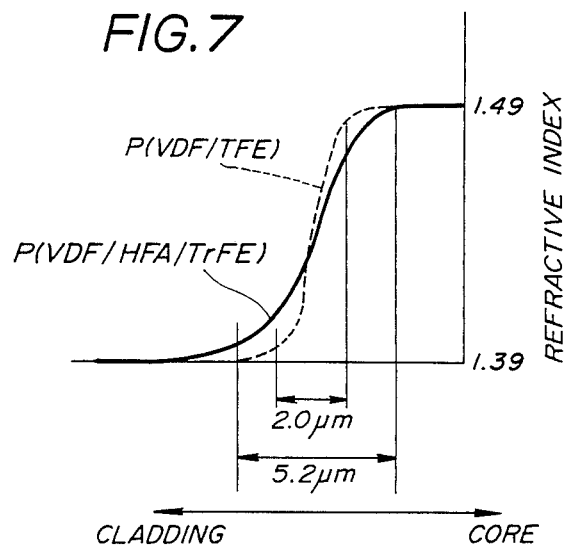
FIG. 7 is a chart showing the distribution of refractivity at the core-cladding interface in an optical fiber as an example of the invention.

The optical fiber produced in this example by using the VDF/HFA/TrFE copolymer 3F-B was crossusing sectionally sliced to obtain a thin specimen, which had a thickness of about 500 μm after polishing its both surfaces. Using this specimen, the core-cladding interface of the optical fiber was observed with a filter type two-beam interference microscope to deduce the distribution of refractive index from variations in interference fringes. The result is shown in FIG. 7. For comparison, another optical fiber having the PMMA core and a cladding layer of a VDF/TFE (80/20 by mol) copolymer was produced by the same method, and a sliced specimen of this optical fiber was subjected to the same observation. As can be seen in FIG. 7, the optical fiber using the VDF/HFA/TrFE copolymer as the cladding material had a broader core-cladding interfacial region wherein the refractive index was varying. Therefore, it is understood that the cladding of the VDF/HFA/TrFE copolymer was very good in mutual solubility with the PMMA core.

EXAMPLE 4

The PMMA resin used in Example 3 was extruded (at 220° C.) into a filament, and the PMMA filament was passed through a coating solution tank, a drier maintained at 50°–60° C. and another drier maintained at 90° C. in succession. The coating solution was prepared by alternately dissolving one of the VDF/HFA/TrFE copolymers 3F-A, 3F-B, 3F-C and the VDF/HFA/TFE copolymers 4F-A, 4F-B, 4F-C in n-butyl acetate. In every case the concentration of the dissolved copolymer was 15 wt %. The thus produced optical fibers were 1 mm in diameter.

The six kinds of optical fibers produced in this example were subjected to the aforementioned light transmission test. The results are shown in Table 3.

TABLE 3

| Cladding Material | Transmission Loss (dB/km) | |
|---|---|---|
|  | Example 3 | Example 4 |
| Copolymer 3F-A | 80.0 | 66.0 |
| Copolymer 3F-B | 78.0 | 61.0 |
| Copolymer 3F-C | 77.0 | 60.0 |
| Copolymer 4F-A | 80.0 | 65.0 |
| Copolymer 4F-B | 75.0 | 58.0 |
| Copolymer 4F-C | 68.0 | 55.0 |

What is claimed is:

1. An optical fiber comprising a solid cylindrical core and a cladding layer which is formed of a ternary copolymer of vinylidene fluoride, hexafluoroacetone and a fluoroethylene having 3 or 4 fluorine atoms.

2. An optical fiber according to claim 1, wherein said ternary copolymer is made up of 2–15 mol % of hexafluoroacetone, 0.5–40 mol % of trifluoroethylene and the balance of vinylidene fluoride.

3. An optical fiber according to claim 2, wherein the amount of said hexafluoroacetone is not less than 4 mol %.

4. An optical fiber according to claim 1, wherein said ternary copolymer is made up of 2–15 mol % of hexafluoroacetone, 5–60 mol % of tetrafluoroethylene and the balance of vinylidene fluoride.

5. An optical fiber according to claim 4, wherein the amount of said hexafluoroacetone is not less than 4 mol %.

6. An optical fiber according to claim 1, wherein said core is formed of an inorganic glass.

7. An optical fiber according to claim 1, wherein said core is formed of an organic polymer.

8. An optical fiber according to claim 7, wherein said organic polymer is polymethyl methacrylate.

* * * * *